United States Patent
Lariviere

(10) Patent No.: US 8,226,101 B2
(45) Date of Patent: Jul. 24, 2012

(54) TORSION SYSTEM FOR TORSION AXLE/SUSPENSION

(75) Inventor: Yves Lariviere, Saint-Constant (CA)

(73) Assignee: Systeme Nenuphar Inc., Saint-Constant (CA)

( * ) Notice: Subject to any disclaimer, the term of this patent is extended or adjusted under 35 U.S.C. 154(b) by 537 days.

(21) Appl. No.: 12/097,133

(22) PCT Filed: Nov. 20, 2006

(86) PCT No.: PCT/CA2006/001901
§ 371 (c)(1),
(2), (4) Date: Dec. 3, 2009

(87) PCT Pub. No.: WO2007/056868
PCT Pub. Date: May 24, 2007

(65) Prior Publication Data
US 2010/0148464 A1    Jun. 17, 2010

(30) Foreign Application Priority Data

Nov. 20, 2005    (CA) .................................... 2526736

(51) Int. Cl.
*B60G 11/23*    (2006.01)
(52) U.S. Cl. .......................... 280/124.169; 280/124.166
(58) Field of Classification Search ............. 280/124.11, 280/124.137, 124.166, 124.169
See application file for complete search history.

(56) References Cited

U.S. PATENT DOCUMENTS

| | | | |
|---|---|---|---|
| 3,436,069 A * | 4/1969 | Henschen | 267/279 |
| 3,601,424 A * | 8/1971 | Badland | 280/124.13 |
| 3,687,479 A * | 8/1972 | Kober | 280/124.13 |
| 3,783,639 A * | 1/1974 | Goodman et al. | 464/83 |
| 4,243,247 A | 1/1981 | Kataoka | |
| 5,203,375 A | 4/1993 | Blanz | |
| 5,263,736 A | 11/1993 | Stevens | |
| 5,277,450 A * | 1/1994 | Henschen | 280/6.151 |
| 5,411,287 A * | 5/1995 | Henschen | 280/124.169 |
| 5,788,265 A | 8/1998 | McLaughlin | |
| 6,003,888 A * | 12/1999 | Godbersen | 280/124.169 |

(Continued)

FOREIGN PATENT DOCUMENTS

CH    191116    3/1937

(Continued)

OTHER PUBLICATIONS

English abstract of FR 0 967 306, Nov. 31, 1950.

(Continued)

*Primary Examiner* — Toan C To
*Assistant Examiner* — Barry Gooden, Jr.
(74) *Attorney, Agent, or Firm* — Robic

(57) ABSTRACT

A torsion system (20) comprising a housing (24) adapted to be secured to a structural portion of a vehicle. A shaft (23) has a core portion (32) accommodated in the housing (24) and defines concavities (34) in the core portion (32). The shaft (23) has a connector end (30) connected to a crank arm. The connector end (30) protrudes out of the housing (24). Elastomeric members (25,25') are received in the concavities (34) of the shaft (23). The elastomeric members (25,25') each have a geometry so as to at least partially fill the concavities (34) and contact an inner surface of the housing (24), whereby a rotation of the crank arm results in a deformation of the elastomeric members (25,25').

13 Claims, 4 Drawing Sheets

U.S. PATENT DOCUMENTS

| | | | |
|---|---|---|---|
| 6,244,613 B1 * | 6/2001 | Renger | 280/440 |
| 6,588,778 B1 * | 7/2003 | McLaughlin | 280/124.13 |
| 6,752,411 B2 * | 6/2004 | Few | 280/124.169 |
| 6,877,728 B2 * | 4/2005 | Gehret | 267/279 |
| 7,261,287 B2 * | 8/2007 | Gehret | 267/279 |
| 2005/0151339 A1 * | 7/2005 | Carty | 280/124.169 |
| 2006/0022424 A1 * | 2/2006 | Reynolds | 280/124.169 |

FOREIGN PATENT DOCUMENTS

| | | |
|---|---|---|
| EP | 0827849 | 3/1998 |
| FR | 0967306 | 11/1950 |
| FR | 1019504 | 1/1953 |
| WO | WO 00/09356 | 2/2000 |

OTHER PUBLICATIONS

English abstract of FR 1 019 504, Jan. 22, 1953.

Suppl. European Search Report for Applicant's correspondning EP application No. 06 80 4759, Jul. 29, 2009.

* cited by examiner

TORSION SYSTEM FOR TORSION AXLE/SUSPENSION

CROSS-REFERENCE TO RELATED APPLICATION

This patent application claims priority on Canadian Patent Application No. 2,526,736, filed on Nov. 20, 2005.

BACKGROUND OF THE INVENTION

1. Field of the Invention

The present invention generally relates to torsion axles and suspensions as used in vehicles such as trailers and, more particularly, to a configuration of torsion system as used in torsion axles and torsion suspensions.

2. Background Art

Torsion axles represent a cost-effective way to provide some independent suspension to the wheels of vehicles. Because they are cost-effective, torsion axles and torsion suspensions are commonly used with low-priced vehicles, such as hitched trailers.

Referring to FIG. 1, a torsion axle in accordance with the prior art is generally shown at 10. The torsion axle 10 has a hub 11 upon which a wheel (not shown) is mounted. The hub 11 is supported by a free end of a crank arm 12. The other end of the crank arm 12 is connected to a torsion system that has a housing 13 of rectangular section, a shaft 14 in the housing 13, and elastomeric members 15 compressed within the housing 13. The shaft 14 has a selected section so as to exert pressure against the elastomeric members 15 when rotating within the housing 13. It is therefore the elastomeric members 15 that provide the shock absorption.

Referring to FIG. 2, a torsion suspension of the prior art is generally shown at 16, and is generally similar to the torsion axle 10, whereby like elements bear like reference numerals. The torsion suspension 16 has a pair of crank arms 12, and the output ends 17 can be used as hubs. The crank arms 12 are optionally independent from one another, in which case each crank arm 12 has its own shaft within the housing 13.

The torsion axles and suspensions of the prior art are currently manufactured by insertion of elongated members 15 of elastomeric material between the shaft 14 and the interior of the housing 13 (FIG. 1). As non-negligible pressures are involved in fitting the shaft 14 and the elongated members 15 in the housing 13 under compression, equipment such as hydraulic presses and freezers is required, therefore resulting in an increase in price of the torsion axle/suspension. Under these circumstances, it is difficult to repair a torsion system if the elastomeric material is damaged or worn. Also, torsion axles/suspensions often have to be delivered from the manufacturer completely assembled.

SUMMARY OF INVENTION

It is therefore an aim of the present invention to provide a torsion system for torsion axles and torsion suspensions that addresses issues associated with the prior art.

Therefore, in accordance with the present invention, there is provided a torsion system comprising: a housing adapted to be secured to a structural portion of a vehicle; a shaft having a core portion accommodated in the housing and defining at least one concavity in the core portion, the shaft having a connector end connected to a crank arm, the connector end protruding out of the housing; and an elastomeric member received in the concavity of the shaft, the elastomeric member having a geometry so as to at least partially fill the concavity and contact an inner surface of the housing; whereby a rotation of the crank arm results in a deformation of the elastomeric member.

Further in accordance with the present invention, there is provided a method for inserting elastomeric members in a torsion system, comprising the steps of: positioning at least one unused elastomeric member on a shaft of a torsion system; manually inserting the shaft and the at least one unused elastomeric member in a housing of the torsion system; and locking support blocks to maintain the shaft and elastomeric member captive in the housing of the torsion system.

BRIEF DESCRIPTION OF DRAWINGS

A preferred embodiment of the present invention will now be described with reference to the accompanying drawings in which.

DESCRIPTION OF PREFERRED EMBODIMENTS

Figure 3:
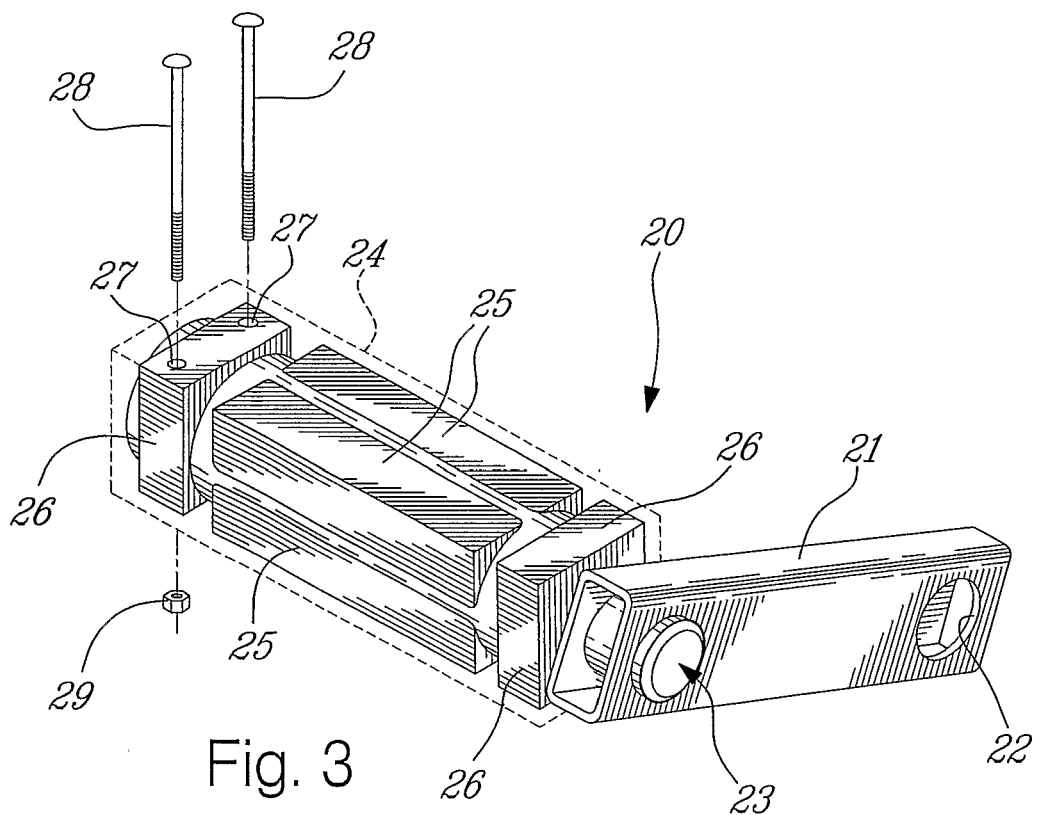
FIG. 3 is a perspective view, fragmented, of a torsion system constructed in accordance with an embodiment of the present invention.

Referring to the drawings, and more particularly to FIG. 3, a torsion system in accordance with an embodiment is generally shown at 20.

The torsion system 20 is shown having a crank arm 21. In the illustrated embodiment, the crank arm 21 is made of a tube of rectangular section, but may be a solid piece, a single machined or cast piece, etc. The crank arm 21 has a connector hole 22 at a free end so as to support a hub, or any other rod-like member compatible with the torsion system 20. Alternatively, the crank arm 21 may incorporate a shaft, hub, or fastener at its free end.

A shaft 23 is connected at the opposed end of the crank arm 21. The shaft 23 is enclosed in housing 24. Elastomeric members 25 are positioned between the shaft 23 and the interior of the housing 24. Support blocks 26 are provided at opposed ends of the shaft 23. Some of the support blocks 26 are used in combination with fasteners, such as bolt 28 and nut 29 passing through the housing 24 at holes 27 to maintain the shaft 23 captive within the housing 24. As other alternatives, a screw (not shown) can be bolted directly into the support block 26, with or without tapping in the holes 27 of the housing 24 or in the support blocks 26. Moreover, the support blocks can be end caps positioned at opposed ends of the housing or the like.

The housing 24 is the interface of the torsion system 20 with the structure of the vehicle. Although not shown, it is considered to provide the housing 24 with connection flanges on its outer surface, such that the torsion system 20 may be connected to the structure of the vehicle using bolts or like fasteners. Moreover, the housing 24 is illustrated as having a square cross-section, but other cross-sectional shapes are considered.

Figure 4:
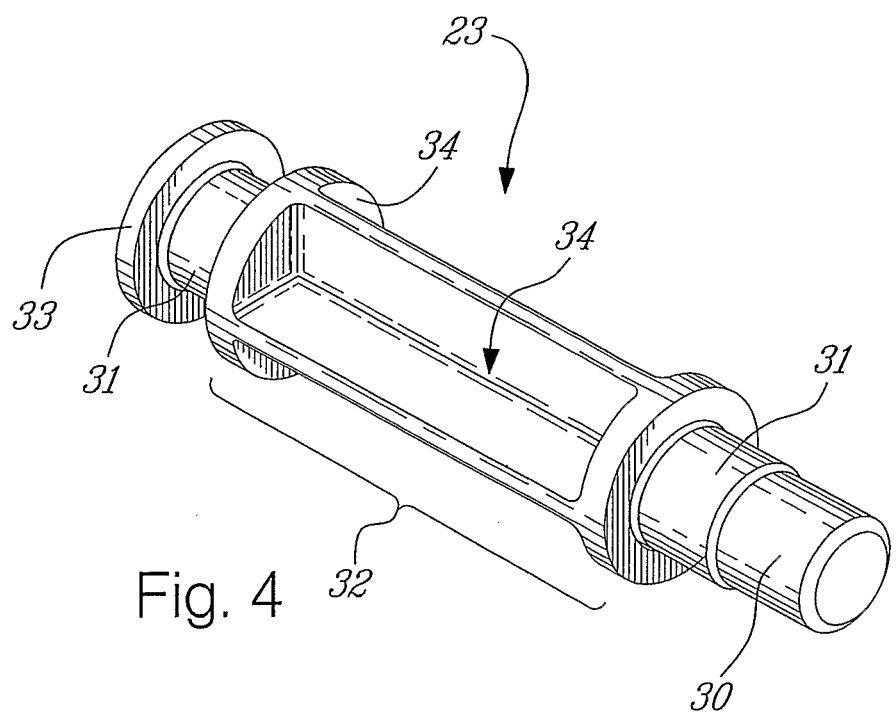
FIG. 4 is a perspective view of a shaft of the torsion system of FIG. 3.

Referring to FIG. 4, the shaft 23 is shown individually. The shaft 23 has a connector end 30, by which it is connected to the crank arm 21. Supported surfaces 31 are separated by a core portion 32. A flange 33 is provided at the end of the shaft 23 away from the connector end 30. In an embodiment, the crank arm 21 and the shaft 23 form an integral piece.

Figure 5:
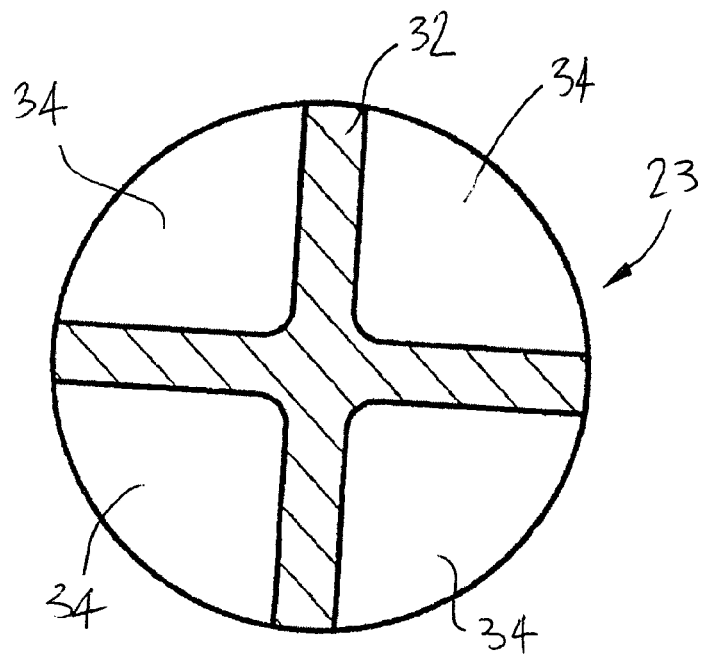
FIG. 5 is a cross-section view of a core portion of the shaft of FIG. 4.

The core portion 32 is the portion of the shaft 23 that will be interfaced with the elastomeric members 25 (FIG. 3). In the embodiment of FIGS. 4 and 5, the core portion 32 is a circular rod in which concavities 34 have been defined. The concavities 34 are receptacles in which a portion of the elastomeric members 25 are received.

Referring to FIG. 5, the core portion 32 is shown having four of the concavities 34, such that the core portion 32 defines a cross-shaped section. Although the illustrated embodiment of the core portion 32 is shown with four concavities 34, it is considered to provide any suitable number of concavities, starting with a single concavity. The number of elastomeric members 25 used will have a direct effect on the shock absorption level of the torsion system 20.

Figure 6:
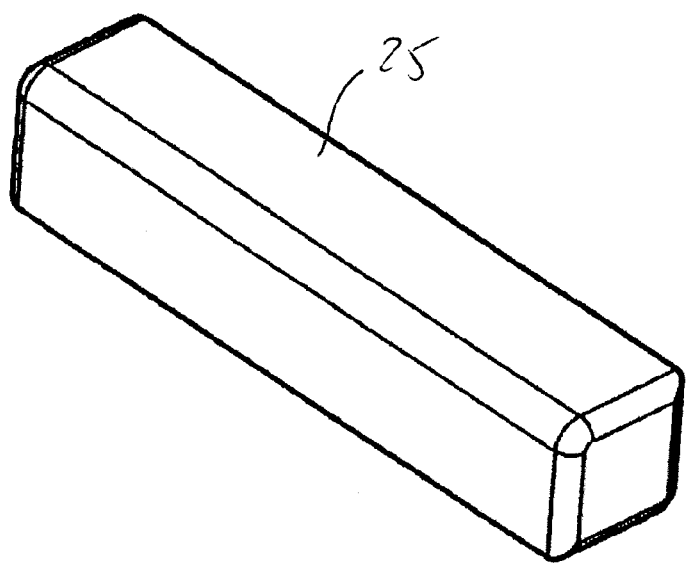
FIG. 6 is a perspective view of a first embodiment of an elastomeric member used in the torsion system of FIG. 3.

Referring concurrently to FIGS. 3 and 6, one of the elastomeric members 25 is shown. The geometry of the elastomeric member 25 is defined so that the elastomeric member 25 matches the shape of one of the concavities 34. Moreover, when accommodated in the concavity 34, the elastomeric member 25 has two of its walls coplanar with the inner walls of the housing 24.

Accordingly, as shown in FIG. 3, a rotation of the shaft 23 about its longitudinal axis is opposed by the elastomeric member 25. The elastomeric members 25 must be deformed for the shaft 23 to rotate about its longitudinal axis. Therefore, the durometer hardness of the elastomer used is selected as a function of the shock absorption level that is desired from the torsion system 20. For an increasing load rating for the torsion system 20, the hardness of the elastomer increases. The elastomeric material used is any suitable elastomer, such as a polymer, a rubber or the like. In one embodiment, the elastomer is urethane at a durometer hardness of 70, but a wide range of hardnesses are considered. It is considered to increase the length and/or diameter of the torsion system 20, so as to increase the load capacity of the torsion system.

In an embodiment, the elastomeric members 25 are extruded. The cross-shaped section of the core portion 32 as embodied in FIG. 3 is advantageous in that all elastomeric members 25 have the same cross-section. Therefore, all elastomeric members 25 may be extruded from a single extrusion.

It is pointed out that the configuration of the shaft 23/elastomeric members 25 enables the torsion system 20 to be mounted without the shaft 23 being pre-stressed. Therefore, as opposed to the prior-art torsion axles and torsion suspensions, neither hydraulic presses nor freezing equipment are required to assemble the torsion system 20 of FIG. 3.

Figure 1:
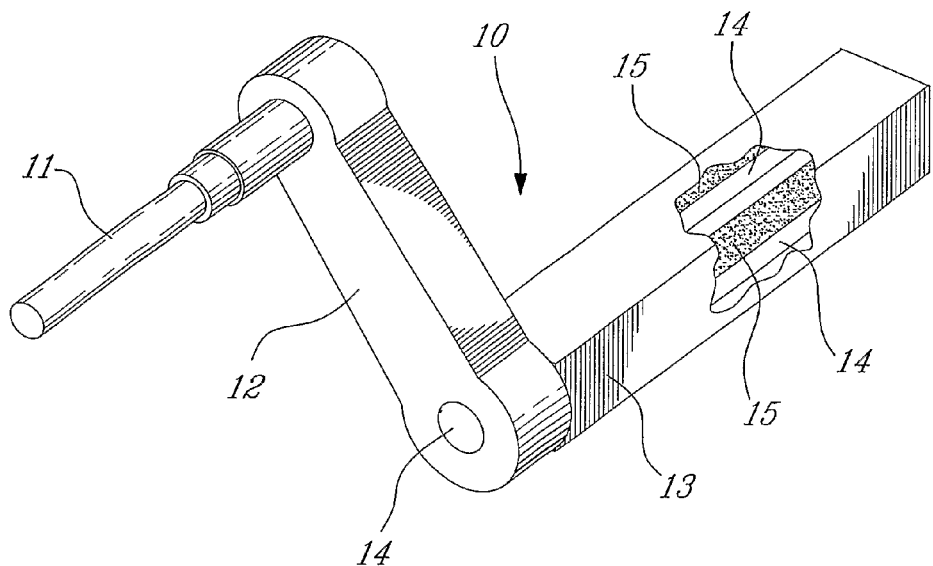
FIG. 1 is a perspective view of a torsion axle constructed in accordance with the prior art.
Figure 2:
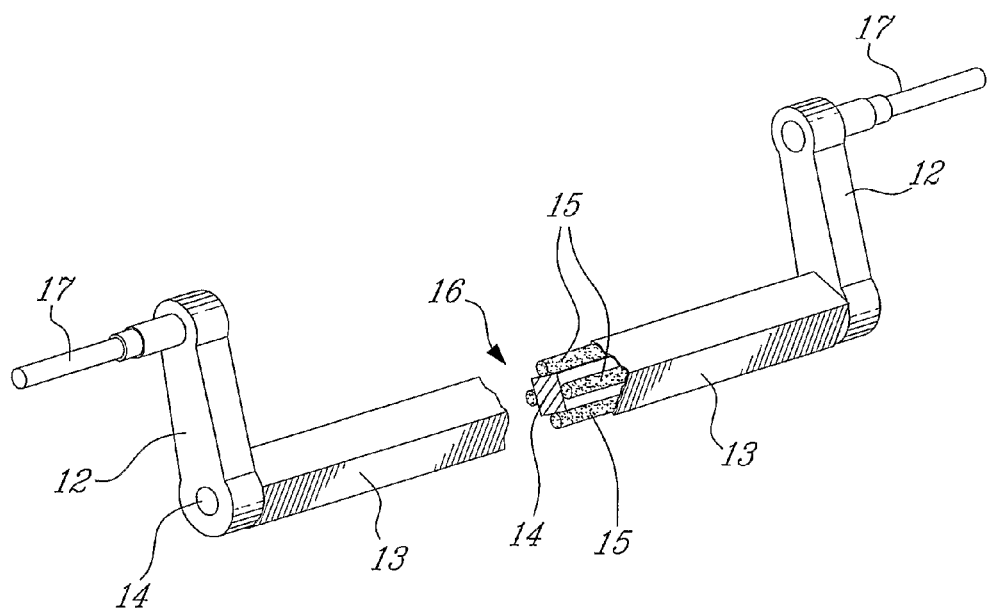
FIG. 2 is a perspective view of a torsion suspension in accordance with the prior art.
Figure 7:
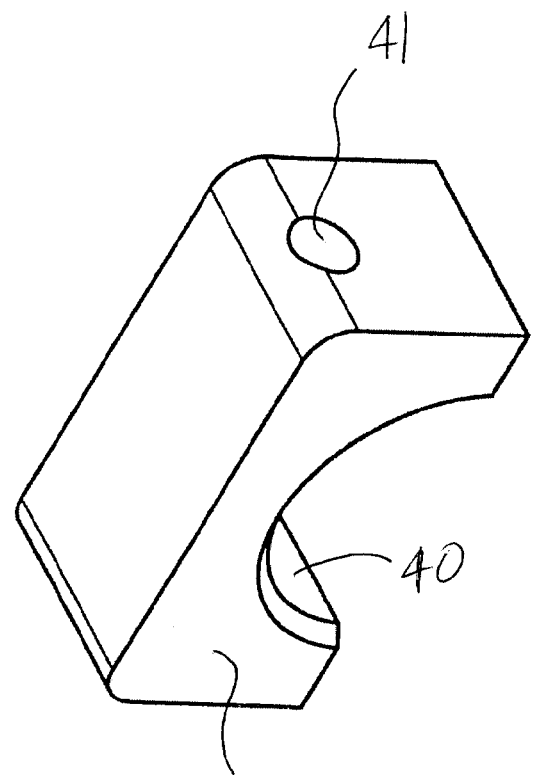
FIG. 7 is a perspective view of a support block of the torsion system of FIG. 3.

One contemplated solution to maintain the shaft 23 aligned within the housing 24 is the support blocks 26. Referring to FIG. 7, the support blocks 26 are used in pairs to define a circular opening by the alignment of semi-cylindrical cavities 40. Two pairs of the support blocks 26 are used to each accommodate one of the supported surfaces 31 of the shaft 23. In FIG. 7, a throughbore 41 is provided in the support block 26. The throughbore 41 is used with a fastener (e.g., bolt) or a rod, to maintain the support block in position within the housing 24. The flange 33 at the end of the shaft 23 (FIG. 1) ensures that the shaft 23 remains in alignment within the housing 24. Although only the distal pair of support blocks 26 are provided with throughbores 41, it is considered to also lock the proximal pair of support blocks 26 with fasteners/rods.

Figure 8:
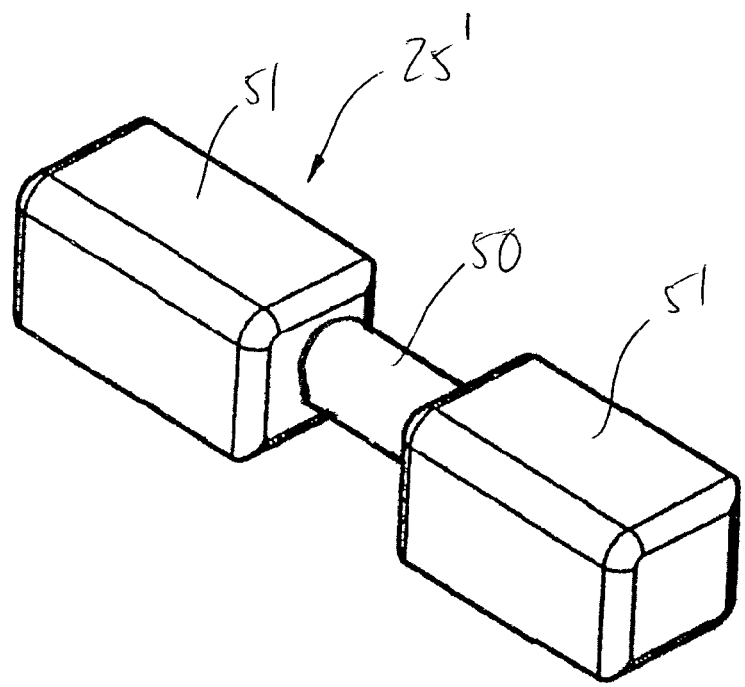
FIG. 8 is a perspective view of a second embodiment of an elastomeric member used in the torsion system of FIG. 3.

Referring to FIG. 8, an alternative embodiment of the elastomeric member is illustrated at 25'. The elastomeric member 25' has a throat portion 50 between opposed ends 51 of operative cross-section. Accordingly, to reduce the resistance of the elastomeric member against the rotation of the shaft 23, the length of the throat portion 50 is increased, as it is the ends 51 that provide the resistance. The elastomeric member may be carved into the shape illustrated by 25' starting from the shape illustrated by 25 by the end user.

As the torsion system 20 is readily assembled without presses and such equipment, it is considered to sell the torsion system 20 separate from the elastomeric members 25. Therefore, elastomeric members 25 can be selected as a function of the shock absorption level desired. Moreover, elastomeric members 25 can be replaced when worn out, by simply removing the shaft 23 from the housing 24. As such, the torsion system can be sold in a kit, with additional or replacement elastomeric members 25 being available to the customer such that the shock absorption level of the torsion system 20 may be changed.

The elastomeric members 25/25' are inserted in the torsion system 20 by positioning the elastomeric member 25/25' on the shaft 23. Whether or not the support blocks 26 are positioned on the shaft 23, the latter is manually inserted with the elastomeric member 25/25' in the housing 24. The support blocks 26 are locked to maintain the shaft 23 and elastomeric member 25/25' captive in the housing 24 of the torsion system 20. The steps are reversed to remove the shaft 23 from the housing 24, for instance to replace the elastomeric members 25/25'.

It is within the ambit of the present invention to cover any obvious modifications of the embodiments described herein, provided such modifications fall within the scope of the appended claims.

The invention claimed is:

1. A torsion system comprising:
 a housing adapted to be secured to a structural portion of a vehicle;
 a shaft having a core portion accommodated in the housing and defining at least one concavity in the core portion, the shaft having a connector end connected to a crank arm, the connector end protruding out of the housing; and
 at least one elastomeric member received in the concavity of the shaft, the elastomeric member having a geometry so as to at least partially fill the concavity and contact an inner surface of the housing;
 a rotation of the crank arm resulting in a deformation of the elastomeric member,
 wherein:
 the shaft has a pair of surfaces of cylindrical shape at opposed ends of the core portion;
 support blocks are provided to operatively support the supported surfaces in the housing and such that the shaft is rotatable about its longitudinal axis; and
 the shaft has one of the supported surfaces between the core portion and a flange, such that the support blocks maintain the shaft captive within the housing.

2. The torsion system according to claim 1, wherein the support blocks are paired at each said supported surface, with each support block having a semi-cylindrical cavity facing one another to define a cylindrical opening in which the supported surface is received.

3. The torsion system according to claim 2, wherein at least one of the pairs of support blocks is secured to the housing.

4. The torsion system according to claim 1, wherein the core portion has a cross-shaped section with four of said concavity.

5. The torsion system according to claim 4, wherein the elastomeric members for each of the four concavities are an elongated member of rectangular cross-section.

6. The torsion system according to claim 5, wherein the elongated members each have a throat portion between a pair of ends having the rectangular cross-section.

7. The torsion system according to claim 5, wherein the elastomeric members are extruded.

8. A method for inserting elastomeric members in a torsion system as defined in claim 1, comprising the steps of:
  positioning at least one unused elastomeric member on the shaft of the torsion system;
  manually inserting the shaft and the at least one unused elastomeric member in the housing of the torsion system; and
  locking support blocks to maintain the shaft and elastomeric member captive in the housing of the torsion system.

9. The method according to claim 8, wherein the step of positioning at least one unused elastomeric member involves inserting the elastomeric member in a concavity of the shaft of the torsion system.

10. The method according to claim 8, wherein the insertion of elastomeric members in the torsion system is preceded by the steps of:
  releasing the support blocks from maintaining the shaft and used elastomeric members captive within the housing of the torsion system;
  manually removing the shaft and the used elastomeric members from the housing; and
  separating the shaft from at least one of the used elastomeric members.

11. The method according to claim 10, wherein the steps of removing and inserting elastomeric members involved a used elastomeric member and an unused elastomeric member of different hardnesses.

12. The method according to claim 8, wherein the step of manually locking the shaft also involves positioning the support blocks on the shaft.

13. The method according to claim 12, wherein the step of locking the support blocks involves passing at least one fastener transversely through at least a portion of the housing and at least a portion of at least one of the support blocks.

* * * * *